(12) United States Patent
Uchikawa

(10) Patent No.: US 7,978,354 B2
(45) Date of Patent: Jul. 12, 2011

(54) RESTRICTION INFORMATION GENERATION APPARATUS AND METHOD, PRINTING SYSTEM WITH FUNCTIONAL RESTRICTION, AND PRINTING AUTHENTICATION METHOD

(75) Inventor: Hiroshi Uchikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1078 days.

(21) Appl. No.: 11/686,664

(22) Filed: Mar. 15, 2007

(65) Prior Publication Data

US 2007/0226808 A1    Sep. 27, 2007

(30) Foreign Application Priority Data

Mar. 24, 2006  (JP) .................. 2006-083870

(51) Int. Cl.
*G06K 15/00* (2006.01)
(52) U.S. Cl. .............. 358/1.14; 358/1.13; 358/1.15
(58) Field of Classification Search .............. 358/1.13, 358/1.14, 1.15
See application file for complete search history.

(56) References Cited

U.S. PATENT DOCUMENTS

| | | | |
|---|---|---|---|
| 7,382,487 B2 * | 6/2008 | Ikegami .................. | 358/1.6 |
| 2002/0097431 A1 | 7/2002 | Ikegami | |
| 2003/0088786 A1 | 5/2003 | Moran et al. | |
| 2003/0167336 A1 | 9/2003 | Iwamoto et al. | |
| 2004/0130743 A1 * | 7/2004 | Nozato .................. | 358/1.14 |
| 2004/0193546 A1 * | 9/2004 | Tokutani et al. .......... | 705/59 |
| 2005/0120244 A1 | 6/2005 | Choi | |
| 2005/0172151 A1 | 8/2005 | Kodimer et al. | |
| 2005/0275868 A1 * | 12/2005 | Higashiura et al. ....... | 358/1.14 |
| 2006/0034630 A1 * | 2/2006 | Yabe ..................... | 399/82 |

FOREIGN PATENT DOCUMENTS

| | | |
|---|---|---|
| CN | 1707504 A | 12/2005 |
| JP | 11-134136 | 5/1999 |
| JP | 2004-185629 | 7/2004 |
| KR | 10-0544478 B | 1/2006 |

OTHER PUBLICATIONS

The above references were cited in a Jan. 23, 2009 Chinese Office Action that issued in Chinese Patent Application No. 200710089760.4, which is enclosed with English Translation.
The above references (1 to 4) were cited in a Sep. 22, 2010 European Search Report of the counterpart European Patent Application No. 07104788.0.
The above references were cited in a May 26, 2008 Korean Office Action, which is enclosed without English Translation, that issued in Korean Patent Application No. 10-2007-0028712.

* cited by examiner

*Primary Examiner* — Chan S Park
*Assistant Examiner* — Jacky X Zheng
(74) *Attorney, Agent, or Firm* — Cowan, Liebowitz & Latman, P.C.

(57) ABSTRACT

A restriction information generation apparatus configured to generate access restriction information to be transmitted from a client terminal to a printing apparatus to determine whether to permit/inhibit execution of a print job based on the access restriction information containing functional restriction information of the printing apparatus, comprises an acquisition unit, adapted to acquire, from a restriction information management server, functional restriction information directly assigned to a user specified by user information received from a requesting client terminal, and indirectly assigned functional restriction information; a merge unit, adapted to merge the pieces of functional restriction information acquired by the acquisition unit to generate access restriction information; and a transmission unit, adapted to transmit the access restriction information generated by the merge unit to the client terminal.

7 Claims, 17 Drawing Sheets

FIG. 3A

| FUNCTIONS | | | | SETTING VALUES |
|---|---|---|---|---|
| 301 APPLICATION RESTRICTION | APPLICATION CATEGORY RESTRICTION | Box | PERMIT | Permit |
| | | | DENY | Deny |
| | | Browser | PERMIT | Permit |
| | | | DENY | Deny |
| | | Copy | PERMIT | Permit |
| | | | DENY | Deny |
| | | Default | PERMIT | Permit |
| | | | DENY | Deny |
| | | Print | PERMIT | Permit |
| | | | DENY | Deny |
| | | Send | PERMIT | Permit |
| | | | DENY | Deny |
| | | Utility | PERMIT | Permit |
| | | | DENY | Deny |
| | APPLICATION ID RESTRICTION | Original Copy | UNSET | |
| | | | PERMIT | usePossible |
| | | | DENY | useImpossible |
| | | Custom Send | UNSET | |
| | | | PERMIT | usePossible |
| | | | DENY | useImpossible |
| | | : | : | |
| 302 PDL PRINT FUNCTION | DENY | | | Deny |
| | PERMIT | | | Permit |
| | | COLOR PRINT | UNRESTRICTED | Color |
| | | | FULL-COLOR PRINT IMPOSSIBLE | BiColor |
| | | | FULL-COLOR / BICOLOR PRINT IMPOSSIBLE | UniColor |
| | | | ONLY MONOCHROME PRINT | Bw |
| | | PRINTING METHOD | SIMPLEX PRINT POSSIBLE | Simplex |
| | | | ONLY DUPLEX PRINT | Duplex |
| | | PAGE LAYOUT | UNRESTRICTED | 1 |
| | | | 1 PAGE / SHEET IMPOSSIBLE | 2 |
| | | | 1 TO 2 PAGES / SHEET IMPOSSIBLE | 4 |
| | | PDL TO BOX | PERMIT | Permit |
| | | | DENY | Deny |
| 303 BOX PRINT FUNCTION | DENY | | | Deny |
| | PERMIT | | | Permit |
| | | COLOR PRINT | UNRESTRICTED | Color |
| | | | FULL-COLOR PRINT IMPOSSIBLE | BiColor |
| | | | FULL-COLOR / BICOLOR PRINT IMPOSSIBLE | UniColor |
| | | | ONLY MONOCHROME PRINT | Bw |
| | | PRINTING METHOD | SIMPLEX PRINT POSSIBLE | Simplex |
| | | | ONLY DUPLEX PRINT | Duplex |
| | | PAGE LAYOUT | UNRESTRICTED | 1 |
| | | | 1 PAGE / SHEET IMPOSSIBLE | 2 |
| | | | 1 TO 2 PAGES / SHEET IMPOSSIBLE | 4 |

FIG. 3B

| | | | | |
|---|---|---|---|---|
| 304 | COPY FUNC-TION | DENY | | Deny |
| | | PERMIT | | Permit |
| | | | COLOR COPY | UNRESTRICTED | Color |
| | | | | FULL-COLOR COPY IMPOSSIBLE | BiColor |
| | | | | FULL-COLOR / BICOLOR COPY IMPOSSIBLE | UniColor |
| | | | | ONLY MONOCHROME COPY | Bw |
| | | | COPYING METHOD | SIMPLEX COPY POSSIBLE | Simplex |
| | | | | ONLY DUPLEX COPY | Duplex |
| | | | PAGE LAYOUT | UNRESTRICTED | 1 |
| | | | | 1 PAGE / SHEET IMPOSSIBLE | 2 |
| | | | | 1 TO 2 PAGES / SHEET IMPOSSIBLE | 4 |
| 305 | SCAN FUNC-TION | DENY | | Deny |
| | | PERMIT | | Permit |
| | | | SCAN | PERMIT | Permit |
| | | | | DENY | Deny |
| | | | COLOR SCAN | COLOR SCAN POSSIBLE | Color |
| | | | | FORCED MONOCHROME SCAN | Bw |
| 306 | SEND FUNC-TION | DENY | | Deny |
| | | PERMIT | | Permit |
| | | | EMAIL SEND | PERMIT | Permit |
| | | | | DENY | Deny |
| | | | I-FAX SEND | PERMIT | Permit |
| | | | | DENY | Deny |
| | | | FAX SEND | PERMIT | Permit |
| | | | | DENY | Deny |
| | | | FTP SEND | PERMIT | Permit |
| | | | | DENY | Deny |
| | | | NCP SEND | PERMIT | Permit |
| | | | | DENY | Deny |
| | | | SMB SEND | PERMIT | Permit |
| | | | | DENY | Deny |
| | | | WebDAV SEND | PERMIT | Permit |
| | | | | DENY | Deny |
| | | | BOX SEND | PERMIT | Permit |
| | | | | DENY | Deny |
| | | | DESIGNATION OF DESTINATION DOMAIN | PERMIT | Permit |
| | | | | DENY | Deny |
| | | | USE OF ADDRESS BOOK | UNRESTRICTED | ReadWrite |
| | | | | ONLY BROWSING | ReadOnly |
| | | | | NOT AVAILABLE | NotAvailable |
| | | | SEND TO NEW ADDRESS | PERMIT | Permit |
| | | | | DENY | Deny |

F I G. 6
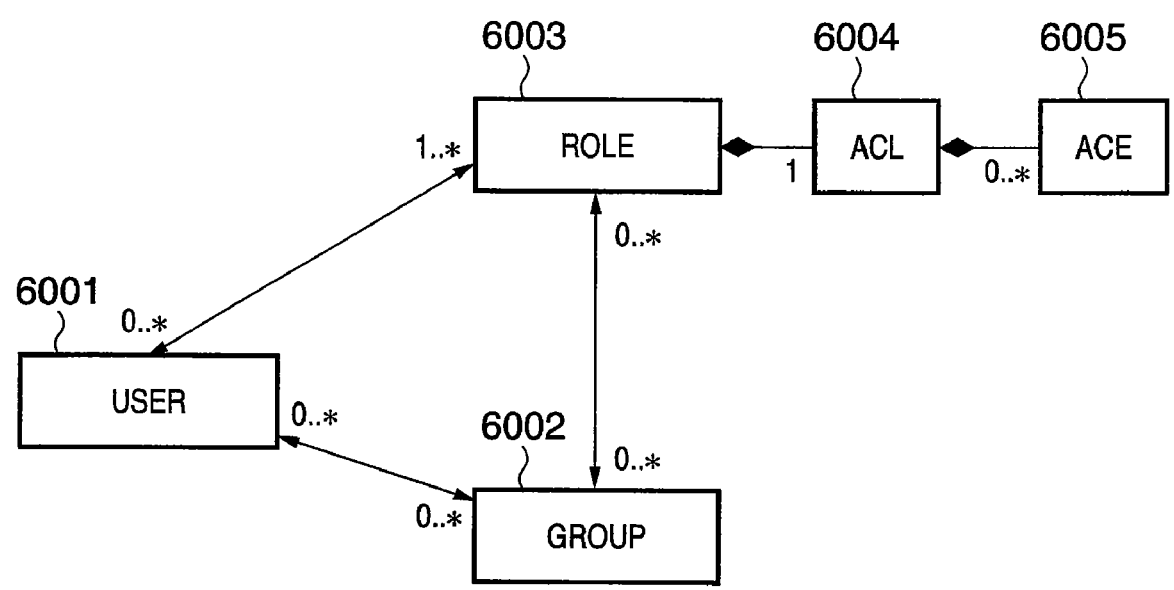

FIG. 11

| CATEGORY OF ITEM | SYNTHESIS / CALCULATION METHOD |
|---|---|
| BASE ROLE | SELECT IN DESCENDING ORDER OF AUTHORITY (Administrator>PowerUser>GeneralUser>LimitedUser/Guest) |
| usePossible / useImpossible | SELECT usePossible WHEN uuid IS REGISTERED AT usePossible FOR GIVEN ROLE AND SAME uuid IS REGISTERED AT useImpossible FOR ANOTHER ROLE |
| PERMIT / DENY | SELECT IN DESCENDING ORDER OF AUTHORITY (Permit>Deny) |
| PRINTING METHOD | SELECT IN DESCENDING ORDER OF AUTHORITY (Simplex>Duplex) |
| PAGE LAYOUT | SELECT IN DESCENDING ORDER OF AUTHORITY (1>2>4) |
| COLOR PRINT COLOR COPY COLOR SCAN | SELECT IN DESCENDING ORDER OF AUTHORITY (Color>BiColor>UniColor>Bw) |
| USE OF ADDRESS BOOK | SELECT IN DESCENDING ORDER OF AUTHORITY (ReadWrite>ReadOnly>NotAvailable) |
| UPPER AVAILABLE COUNT (COUNTER) | SELECT IN DESCENDING ORDER |

FIG. 12A

```xml
<?xml version="1.0" encoding="UTF-8"?>
<ACT xmlns="http://www.canon.com/"
    xmlns:saml="urn:oasis:tc:SAML:2.0:assertion"
    xmlns:xsi="http://www.w3.org/2001/XMLSchema-instance"
<Version>01.01</Version>
<UserInfo>  ──── 12001
   <UserName>user_0001</UserName>
   <BaseRole>GeneralUser</BaseRole>
   <UserEmail>user_0001@mail.com</UserEmail>
</UserInfo>
<DeviceAccessControl>  ──── 12002
  <AttributeCategory Name="Application" CategoryStatus="Static">
   <saml:AttributeStatement>
    <saml:Attribute Name="ApplicationId">
     <saml:AttributeValue Name="UseImposible">
8c72686b-29c2-46c5-a07a-a6c4177a61e3</saml:AttributeValue>
    </saml:Attribute>
    <saml:Attribute Name="ApplicationCategory">
     <saml:AttributeValue Name="PrintCategory">Permit</saml:AttributeValue>
     <saml:AttributeValue Name="CopyCategory">Deny</saml:AttributeValue>
     <saml:AttributeValue Name="SendCategory">Deny</saml:AttributeValue>
     <saml:AttributeValue Name="BoxCategory">Permit</saml:AttributeValue>
     <saml:AttributeValue Name="BrowserCategory">Deny</saml:AttributeValue>
     <saml:AttributeValue Name="UtilityCategory">Deny</saml:AttributeValue>
    </saml:Attribute>
   </saml:AttributeStatement>
  </AttributeCategory>
  <AttributeCategory Name="DeviceCapability" CategoryStatus="Static">
   <saml:AttributeStatement>
    <saml:Attribute Name="LocalPrint">
     <saml:AttributeValue Name="LocalPrintFlag">Permit</saml:AttributeValue>
     <saml:AttributeValue Name="ColorPrint">Color</saml:AttributeValue>
     <saml:AttributeValue Name="Simplex">Permit</saml:AttributeValue>
     <saml:AttributeValue Name="Nup">4</saml:AttributeValue>
    </saml:Attribute>
```

FIG. 12B

```
<saml:Attribute Name="Copy">
  <saml:AttributeValue Name="CopyFlag">Permit</saml:AttributeValue>
  <saml:AttributeValue Name="ColorCopy">BiColor</saml:AttributeValue>
  <saml:AttributeValue Name="Simplex">Permit</saml:AttributeValue>
  <saml:AttributeValue Name="Nup">4</saml:AttributeValue>
</saml:Attribute>
<saml:Attribute Name="Scan">
  <saml:AttributeValue Name="ScanFlag">Permit</saml:AttributeValue>
  <saml:AttributeValue Name="ColorScan">Bw</saml:AttributeValue>
</saml:Attribute>
<saml:Attribute Name="Send">
  <saml:AttributeValue Name="SendFlag">Permit</saml:AttributeValue>
  <saml:AttributeValue Name="Email">Deny</saml:AttributeValue>
  <saml:AttributeValue Name="Fax">Deny</saml:AttributeValue>
  <saml:AttributeValue Name="Ftp">Deny</saml:AttributeValue>
  <saml:AttributeValue Name="AddressManagement">ReadOnly</saml:AttributeValue>
  <saml:AttributeValue Name="SendNewAddress">Deny</saml:AttributeValue>
</saml:Attribute>
</saml:AttributeStatement>
</AttributeCategory>
<Attribute Category Name="Quota" CategoryStatus="Dynamic">
  <saml:AttributeStatement>
    <saml:Attribute Name="Print">
      <saml:AttributeValue Name="ColorPrintTotal">1000</saml:AttributeValue>
      <saml:AttributeValue Name="BwPrintTotal">1000</saml:AttributeValue>
    </saml:Attribute>
  </saml:AttributeStatement>
</AttributeCategory>
</DeviceAccessControl>
</ACT>
```

FIG. 13

| CATEGORY OF ITEM | SYNTHESIS / CALCULATION METHOD |
|---|---|
| BASE ROLE | SELECT IN ASCENDING ORDER OF AUTHORITY (Guest>LimitedUser>GeneralUser>PowerUser>Administrator) |
| usePossible / useImpossible | SELECT useImpossible WHEN uuid IS REGISTERED AT usePossible FOR GIVEN ROLE AND SAME uuid IS REGISTERED AT useImpossible FOR ANOTHER ROLE |
| PERMIT / DENY | SELECT IN ASCENDING ORDER OF AUTHORITY (Deny>Permit) |
| PRINTING METHOD | SELECT IN ASCENDING ORDER OF AUTHORITY (Duplex>Simplex) |
| PAGE LAYOUT | SELECT IN ASCENDING ORDER OF AUTHORITY (4>2>1) |
| COLOR PRINT COLOR COPY COLOR SCAN | SELECT IN ASCENDING ORDER OF AUTHORITY (Bw>UniColor>BiColor>Color) |
| USE OF ADDRESS BOOK | SELECT IN DESCENDING ORDER OF AUTHORITY (NotAvailable>ReadOnly>ReadWrite) |
| UPPER AVAILABLE COUNT (COUNTER) | SELECT IN ASCENDING ORDER |

RESTRICTION INFORMATION GENERATION APPARATUS AND METHOD, PRINTING SYSTEM WITH FUNCTIONAL RESTRICTION, AND PRINTING AUTHENTICATION METHOD

BACKGROUND OF THE INVENTION

1. Field of the Invention

The present invention relates to a restriction information generation apparatus and method, a printing system with functional restriction, and a printing authentication method for utilizing a peripheral device or the like which determines whether to permit/inhibit the use of its function in accordance with functional restriction defined for each user role.

2. Description of the Related Art

Computer networks (to be simply referred to as networks hereinafter), which connect computers to each other, further connect to each other to form a global network or so-called Internet.

In many cases, a network connects peripheral devices (printing apparatuses) such as a printer, facsimile apparatus, and copying machine in addition to computers. A computer can utilize these peripheral devices via the network. Printing via the network (network printing) has advantages of sharing a large-scale high-speed printer or expensive color printer between computers, and printing from a remote site. These days, network printing becomes popular.

Recent copying machines have not only a function of copying a document, but also a function of printing a print job from an external client apparatus and a function of electronically transmitting a scanned document outside using an email/file transfer function. Such a copying machine is called an MFP (Multi Function Peripheral).

While the functions of the MFP vary, management problems arise such as high risk of information leakage because the MFP can send scanned information outside. These are conventional problems. As the number of print sheets increases, the costs of consumed paper and toner also rise. There are needs to restrict the print function and the number of printable sheets for each user. These needs are essential in terms of reduction of TCO (Total Cost of Ownership).

Several solutions to these problems have already been proposed. For example, there is proposed a method of managing each user by his ID, and restricting available functions, resources, and time for each ID (Japanese Patent Laid-Open No. 11-134136). There is also proposed a method of issuing access policy information to an authenticated user (Japanese Patent Laid-Open No. 2004-185629).

Access to the MFP is restricted by identifying and confirming an MFP user by an authentication system, and approving only an operation permitted to the user. Whether to permit or inhibit an operation is generally set for each role permitted to each organization or each user's job title based on personnel information in a company or school to which a user belongs. For example, users are classified into roles such as an administrator, power user, general user, and guest. Functional restriction (synonymous to access restriction in this specification) is defined for each role.

A user belongs to a plurality of organizations in accordance with the hierarchical structure of organizations. An organization is definable as a user group in a computer. Similar to a user, groups are also classified into roles, and functional restriction for each role is also applied to the group. Even an operation inhibited to a role into which a given user is directly classified may be permitted to a role into which a group containing the user is classified. However, how to solve a situation in which contradictory functional restrictions are set for one user is not mentioned in even the above-described references.

Functional restriction defined for each role may be determined by calculation based on a given rule by referring to a plurality of roles when a user or group is classified into only a role into which the user is classified. However, reference and calculation of the role are done in user's login in real time with high-speed performance. From the viewpoint of the process speed and cost, it is not desirable to execute these processes by each MFP.

The authentication system and role setting system often change depending on the user environment at the installation destination. It is not flexible to change the program of each MFP in accordance with the user environment.

When the user wants to change the role calculation rule, it is not flexible and increases the management cost to change the program of each MFP and a program installed in a client PC which uses the MFP.

SUMMARY OF THE INVENTION

The present invention has been made in consideration of the above situation, and has as its object to merge functional restrictions into one by referring to the functional restrictions defined for respective roles into which the user is classified. Especially, it is another object of the present invention to prevent rejection of the use of a function originally executable by the user by selecting the largest authority value for each item of functional restrictions to be merged.

According to a first aspect of the present invention there is provided a restriction information generation apparatus configured to generate access restriction information to be transmitted from a client terminal to a printing apparatus to determine whether to permit/inhibit execution of a print job based on the access restriction information containing functional restriction information of the printing apparatus, comprising:

an acquisition unit, adapted to acquire, from a restriction information management server (1001), functional restriction information directly assigned to a user specified by user information received from a requesting client terminal (1003), and indirectly assigned functional restriction information;

a merge unit, adapted to merge the pieces of functional restriction information acquired by the acquisition means to generate access restriction information; and a transmission unit, adapted to transmitting the access restriction information generated by the merge means to the client terminal.

According to the above arrangement, functional restrictions are implemented by referring to the functional restrictions defined for respective roles into which the user is classified. Particularly, rejection of the use of a function originally executable by the user can be prevented by selecting the largest authority value for each item of functional restrictions to be merged.

The load on the MFP can be reduced to perform the process even by low-cost hardware by executing the merge process by a restriction information generation apparatus other than an MFP.

Even when the authentication system and role setting system change depending on the user environment at the installation destination, the process can be flexibly and easily fitted for the user environment by changing its contents to be executed by the restriction information generation apparatus.

Even when the user wants to change the functional restriction merge rule, a flexible, easy-to-maintain system can be implemented without maintaining either the MFP or client.

Further features of the present invention will become apparent from the following description of exemplary embodiments (with reference to the attached drawings).

BRIEF DESCRIPTION OF THE DRAWINGS

FIG. 3A is a table showing a settable functional restriction information list in the first embodiment;

FIG. 3B is a table (continued from FIG. 3A) showing the settable functional restriction information list in the first embodiment;

FIG. 6 is a view showing the class structure of a user, group, role, functional restriction information list, and functional restriction information in the first embodiment;

FIG. 11 is a table showing the merge condition of a merge process for the applied access control token 1005 in the first embodiment;

FIG. 12A is a view showing an example of the generated access control token 1005 in the first embodiment;

FIG. 12B is a view (continued from FIG. 12A) showing the example of the generated access control token 1005 in the first embodiment;

FIG. 13 is a table showing the merge condition of a merge process for the applied access control token 1005 in the second embodiment.

DESCRIPTION OF THE EMBODIMENTS

First Embodiment

<Outline of System>

Figure 1:
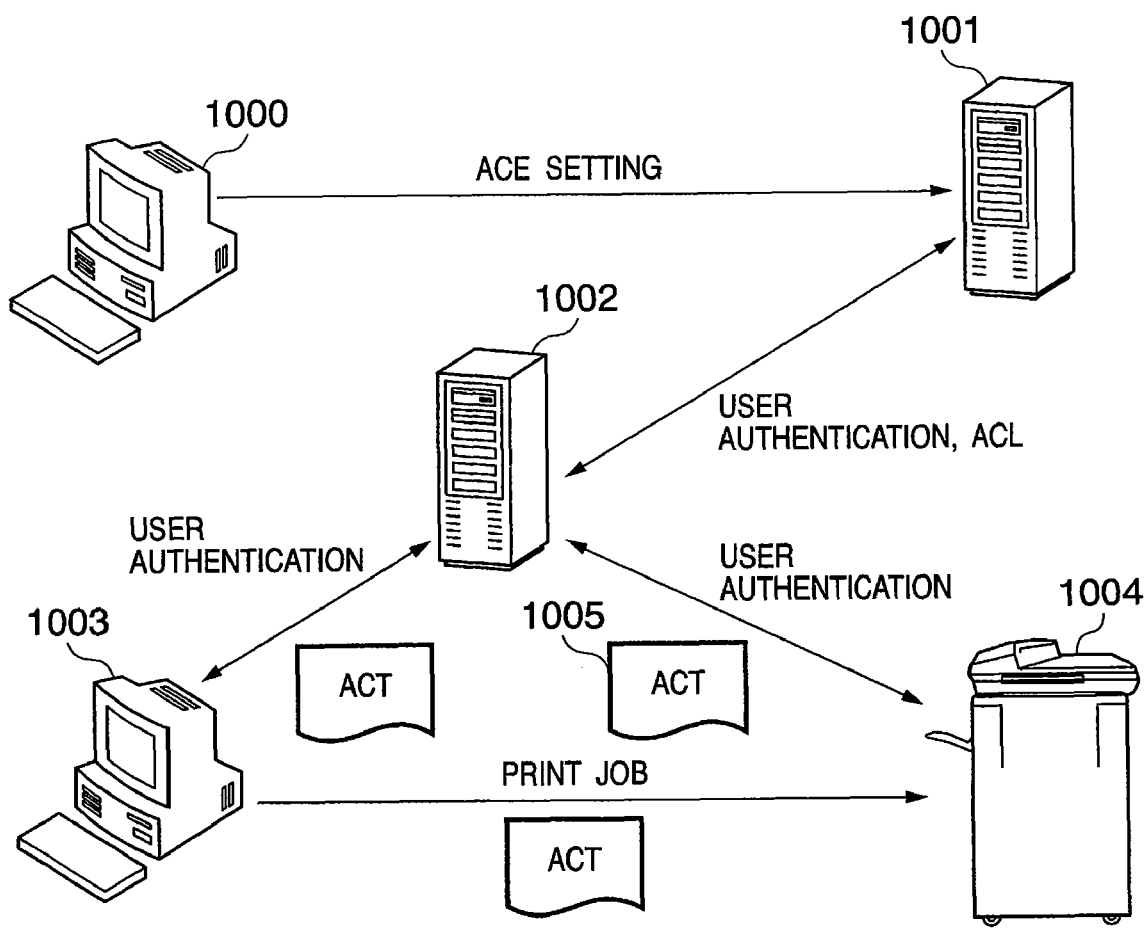
FIG. 1 is a view showing a general system configuration in the first embodiment.

The first embodiment will be described below. FIG. 1 shows a general system configuration in the first embodiment. The system in the first embodiment comprises a device, server PC, and client PC connected on a network. The system is a print management system which restricts access from a device user and job execution such as the number of print sheets. The user includes an individual user, department, and organization. A user ID is assigned to a user, and the user inputs the user ID in login to the client PC.

An administrator utility (AU) 1000 is represented as a computer in FIG. 1, but is a program which runs on the server PC to set and manage the system. In particular, the administrator utility 1000 can set functional restriction information (called ACE) of a user information server 1001. The functional restriction information is a data file (to be described later) having contents as shown in FIG. 3.

The user information server 1001 holds user information (e.g., a user ID and password), and a functional restriction information list (called an ACL) as a set of pieces of functional restriction information representing which function is permitted to be used for each user or device in the system. The user information server 1001 can also be called a restriction information management server. The user information server 1001 is implemented using an LDAP server, a Microsoft Active Directory server, or the like.

A ticket issuance server 1002 issues a ticket (called a function description ticket or access control token (ACT)) which describes information on available functions based on the functional restriction information list stored in the user information server 1001. The ticket will be described later.

A printer driver (Drv) 1003 is a program running on the client PC. When using the client PC, the user must log in so as to identify the user of the client PC, as described above.

A multifunction peripheral (MFP) 1004 is a multifunctional copying machine. The MFP 1004 has a function of copying a paper document and a function of printing print data sent from an external printer driver. The MFP 1004 further has a function (send function and remote scan function) of scanning a paper document and sending the image data to an external file server or mail address. The MFP 1004 also has a function (remote copy function) of sending scanned data to another MFP and printing it using the destination MFP. The MFP 1004 determines whether to permit/inhibit execution of a print job based on ticket information which records functional restriction information.

An access control token (ACT) 1005 describes information on functions executable by the user in the MFP 1004, and functional restriction information to the MFP 1004. The access control token 1005 transmits these pieces of information from the server to the device.

The network nodes 1000 to 1004 connect to each other by Ethernet® (not shown). However, this configuration is merely an example of the system. The administrator utility 1000, user information server 1001, ticket issuance server 1002, and printer driver 1003 other than the MFP 1004 may be formed from a client computer or several server computers. Interfaces between the administrator utility 1000, the ticket issuance server 1002, and the printer driver 1003 may be physical communication media such as a network, local interface, and CPU bus. Alternatively, these interfaces may be formed from software logical interfaces for message communication. These functional blocks may execute their functions by executing a program by the CPU, or may be mounted on a hardware circuit.

A concrete sequence of the operation of the whole system shown in FIG. 1 is as follows.

(1) The administrator utility 1000 sets functional restriction information of each user in the user information server 1001. The user information server 1001 saves a functional restriction information list.

(2) In power-on, reset, or the like, the MFP 1004 requests the ticket issuance server 1002 to issue an access control token 1005 which describes functional restriction information of the MFP 1004.

(3) The ticket issuance server 1002 acquires functional restriction information of the MFP 1004 from the functional restriction information list stored in the user information server 1001, and issues the information-containing access control token 1005. The ticket issuance server 1002 adds an electronic signature to prove that the ticket issuance server 1002 issues the access control token 1005. Then, the ticket issuance server 1002 sends back the access control token 1005 to the MFP 1004.

(4) The MFP 1004 makes internal initial settings based on the contents of the acquired access control token 1005.

(5) Before issuing a print job to the MFP 1004, the printer driver 1003 requests the ticket issuance server 1002 to issue an access control token 1005 associated with a user who is to issue a job.

(6) The ticket issuance server 1002 acquires functional restriction information corresponding to the user who is to issue a job from the functional restriction information list stored in the user information server 1001. The ticket issuance server 1002 generates an access control token 1005 which reflects settings permitted to the user. The ticket issuance server 1002 adds an electronic signature to prove that the ticket issuance server 1002 issues the access control token 1005. Then, the ticket issuance server 1002 sends back the access control token 1005 to the printer driver 1003.

(7) The printer driver 1003 adds the acquired access control token 1005 as the header of a print job, and transmits the job to the MFP 1004.

(8) Upon reception of the job, the MFP 1004 compares the functional restriction information described in the access control token 1005 in the job with job information to be actually executed by the job. If all functions for use described in the job information are available, the MFP 1004 executes the request; otherwise, the MFP 1004 cancels or suspends the job.

<Configuration of Computer>

Figure 2:
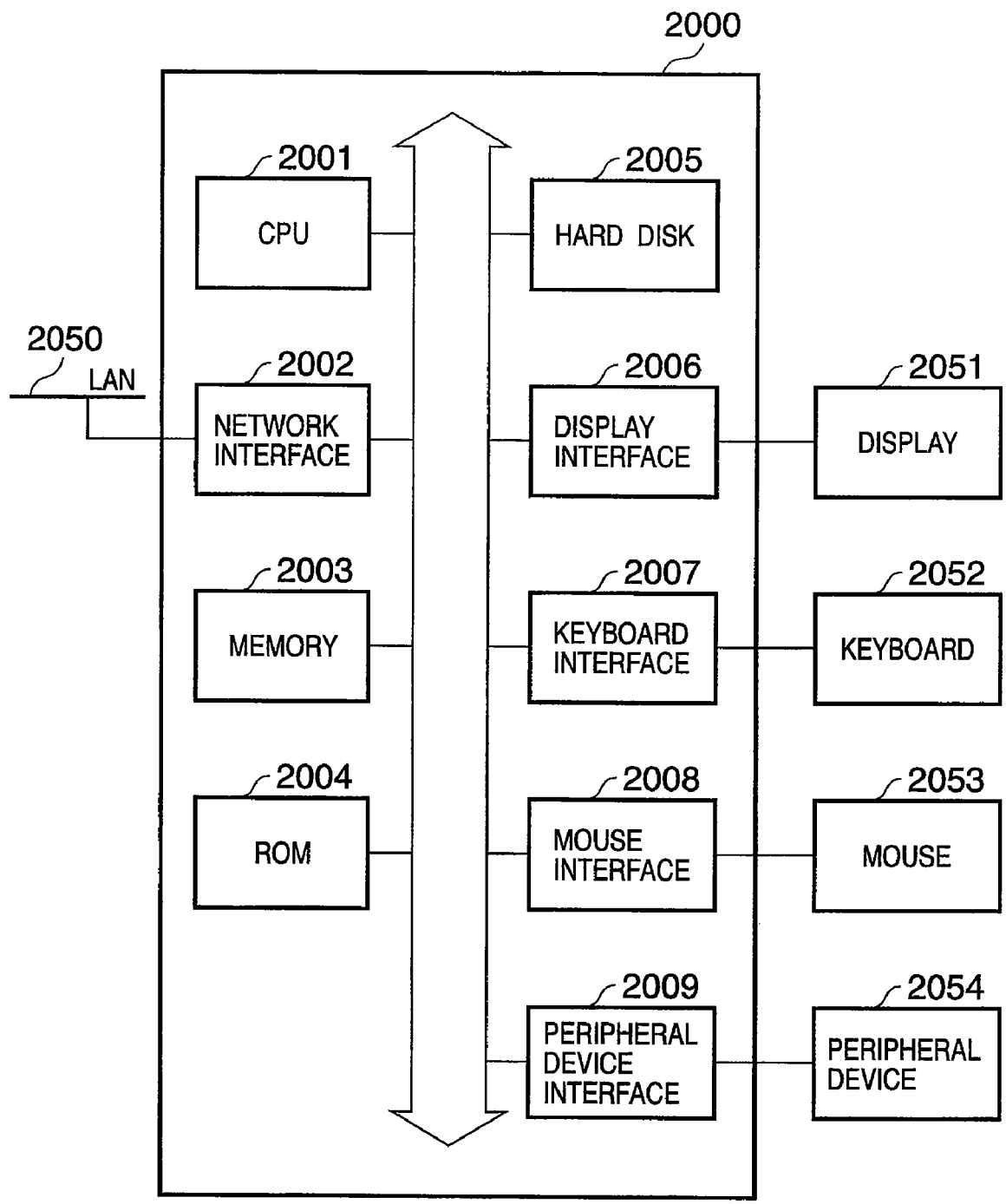
FIG. 2 is a block diagram showing the hardware configuration of a server computer in which server software is installed in the first embodiment.

FIG. 2 is a block diagram showing the hardware configuration of the computer in which the administrator utility 1000, user information server 1001, ticket issuance server 1002, and printer driver 1003 run in the first embodiment.

A main CPU 2001 is a central processing unit which controls an entire computer 2000. The main CPU 2001 executes programs stored in a ROM 2004 and hard disk unit 2005.

A network interface 2002 is a control unit for communicating data with another device via a network. Software executed by the CPU 2001 can bidirectionally exchange data with a printing device, another network device, or another computer via a LAN 2050.

A memory 2003 is generally a volatile storage for saving instructions, data, and the like executed by the CPU 2001.

The ROM 2004 is a read-only storage for saving programs, data, and the like for basic hardware control.

The hard disk unit 2005 is generally a nonvolatile storage which saves programs, calculated data, and the like executed by the computer 2000. The hard disk unit 2005 stores a boot program (start-up program: a program to start executing (operating) hardware and software), a plurality of applications, edit files, user files, a network management program, and the like. In the user information server 1001, the hard disk saves user information representing the role of each user ID and a group to which the user belongs. The hard disk also saves a group to which the user belongs, and a group to which the group further belongs. The hard disk also stores a list of pieces of functional restriction information of respective roles.

A display interface 2006 is a control unit for connecting a display for displaying the internal state and execution state of the computer 2000 and the like. A display 2051 displays the internal state and execution state of the computer and the like. Software executed by the CPU 2001 can draw a graphical user interface on the display 2051.

A keyboard interface 2007 and mouse interface 2008 allow connecting input devices for inputting data and instructions from the user to the computer 2000. Examples of the input devices are a keyboard 2052 and mouse 2053.

A peripheral device interface 2009 is a control unit for connecting a peripheral device 2054 complying with specifications such as USB, RS-232C serial, and IEEE1394. Examples of the peripheral device 2054 are an external storage device (e.g., a CD-ROM drive or memory medium drive), and a user authentication apparatus for specifying a user.

<Functional Restriction Information>

FIGS. 3A and 3B show a functional restriction information list in the first embodiment. FIGS. 3A and 3B show not functional restriction information itself, but items contained in the functional restriction information and choices of the value of each item. For example, the functional restriction information is provided as a data file available for a computer by describing the item ID and value of each item with predefined XML tags or the like.

In FIGS. 3A and 3B, an "application restriction" item 301 represents access restriction to applications (e.g., copy, send, box, print, and browser) provided by the MFP. A user interface (for example, user interface of a printer driver or user interface of MFP) does not display the selection column of a restricted application so as not to allow selection of the restricted application. When printing data generated by an application, the application generates data regardless of its functional restriction. Even if the application is not selectable in printing, a restricted function may be used in printing.

The application restriction item 301 includes functional restriction associated with an application category representing the properties and types of applications (to be referred to as application category restriction), and functional restriction associated with each application having an ID (to be referred to as application ID restriction). When the functional restriction associated with an application and the functional restriction associated with an application category to which the application belongs are contradictory, the functional restriction associated with the application is employed. Either "permit" or "deny" is settable for the functional restriction associated with an application category. One of "usePossible", "useImpossible", and "unset (blank)" is settable for the functional restriction associated with an application. Each application is identified based on an application ID assigned to each application. In FIG. 3A, an application ID "Original-Copy" is registered to the functional restriction information list, for example.

A PDL print function 302, box print function 303, and copy function 304 have functional restriction information on color restriction, simplex/duplex restriction, and layout restriction when outputting data on paper. One of "unrestricted", "full-color print impossible", "full-color/bicolor print impossible", and "only monochrome" is settable for color restriction. The printing method is either "duplex" or "simplex". The page layout is one of "unrestricted", "1 page/sheet impossible", and "1 to 2 pages/sheet impossible". These settings are made with code values corresponding to setting contents.

A scan function 305 has functional restriction information on color restriction when converting a paper document into electronic data. A send function 306 has functional restriction information on the transfer protocol, address book, and destination when transmitting electronic data.

<Device Information and User Information>

Figure 4:
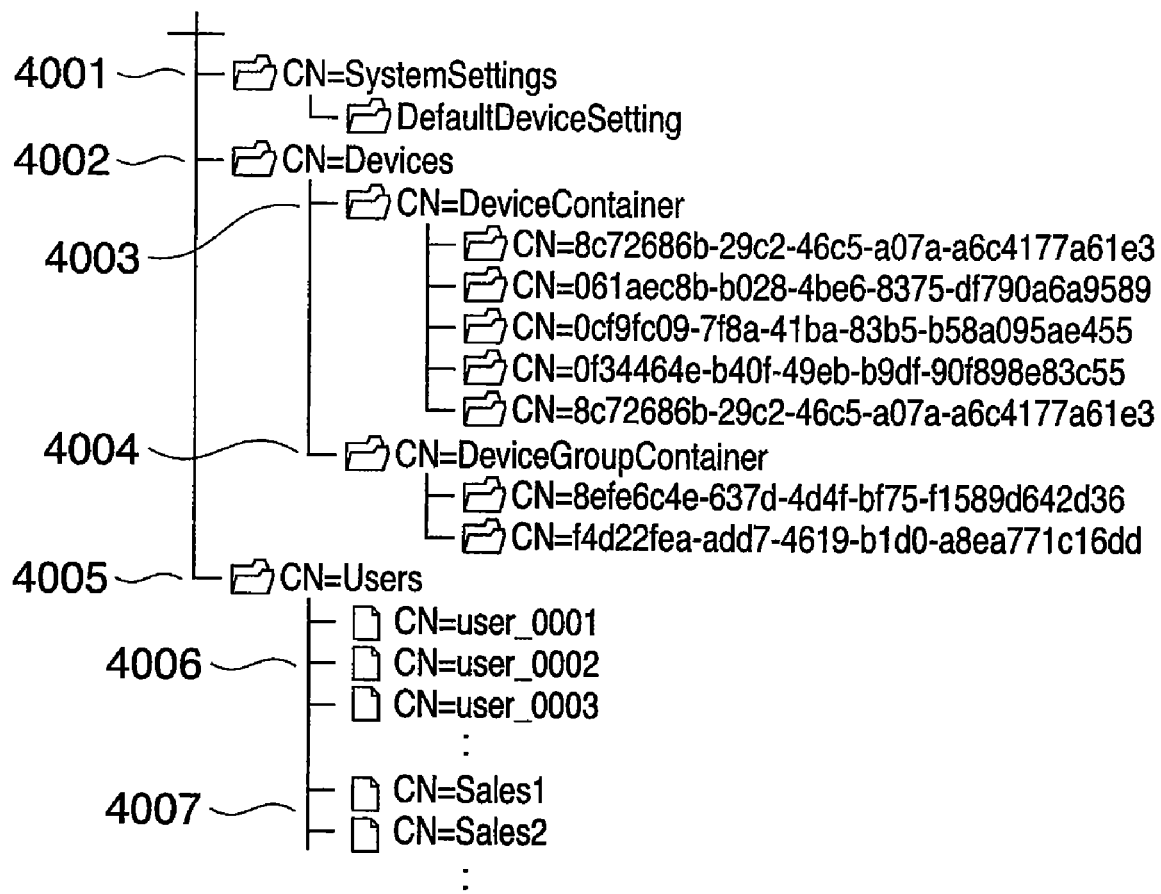
FIG. 4 is a view showing the directory structures of device information and user information stored in a user information server 1001 in the first embodiment.

FIG. 4 shows the directory structures of device information and user information stored in the user information server 1001 in the first embodiment. The administrator utility sets the device information and user information.

SystemSettings 4001 is the container of a system policy applied to the overall system, and contains subordinate default settings.

Devices 4002 is a device information container, and contains subordinate DeviceContainer 4003 and DeviceGroupContainer 4004. The DeviceContainer 4003 is a container which contains subordinate device information registered in the system. For example, a host name, password, and the like are registered for each device.

These pieces of device information are registered in one of the following registration modes selected by changing the SystemSettings 4001:

(1) an automatic registration mode in which pieces of device information are registered automatically upon starting up the MFP 1004, (2) a host name check mode to check whether a host name notified from the MFP 1004 exists below the DeviceContainer 4003, and (3) a password check mode to check whether a host name notified from the MFP 1004 exists below the DeviceContainer 4003 and check whether the password coincides with the SystemSettings 4001.

When the host name check mode or password check mode is selected but a condition such as a host name or password is not satisfied, an error is sent back in response to a registration request from the MFP 1004 without registering any device. If the condition is satisfied, a device is registered.

The DeviceGroupContainer 4004 is a container which contains subordinate device group information on a group of devices.

Users 4005 is a container which contains subordinate user group information on a user or a group of users.

Figure 5A:
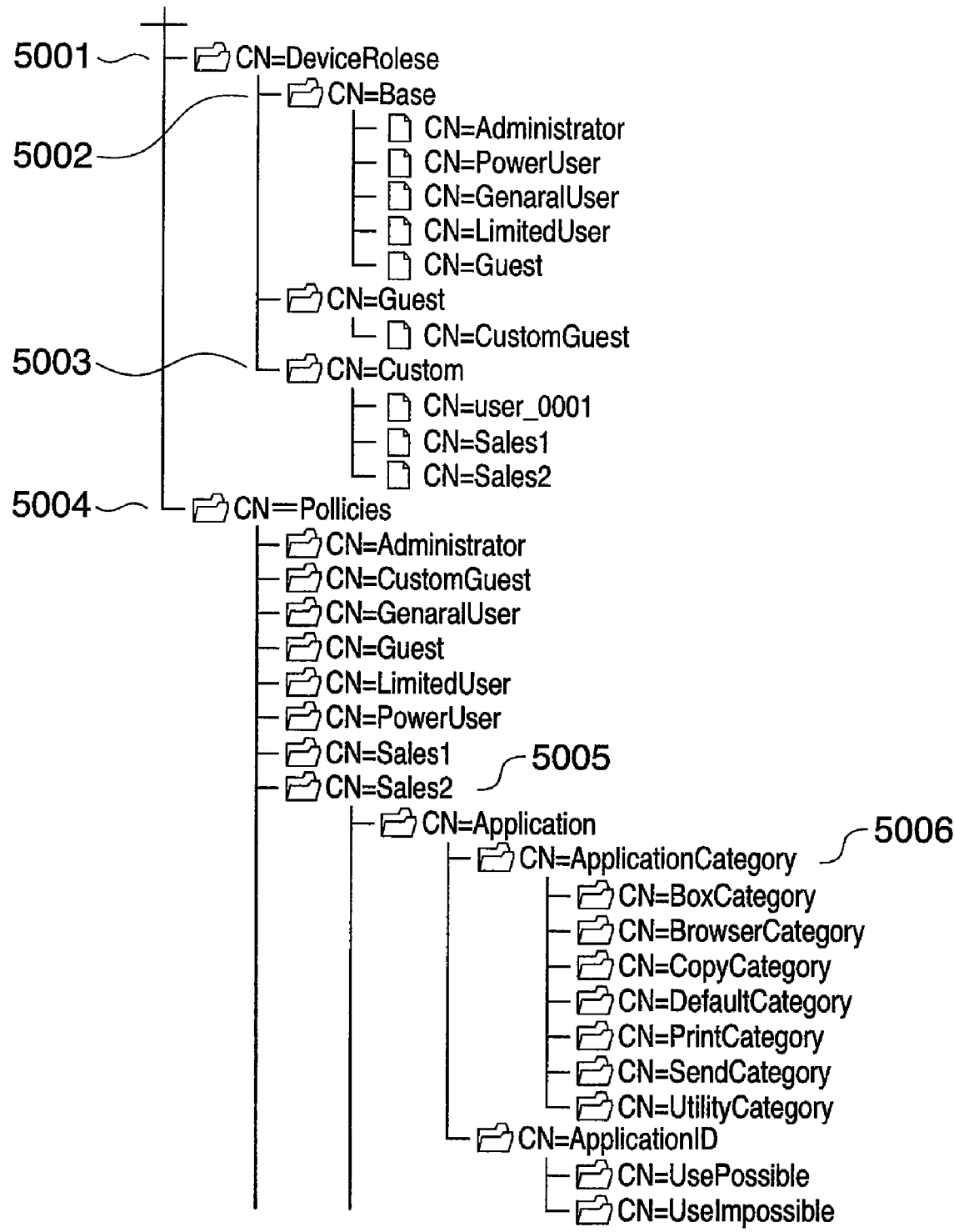
FIG. 5A is a view showing the directory structure of a functional restriction information list stored in the user information server 1001 in the first embodiment.
Figure 5B:
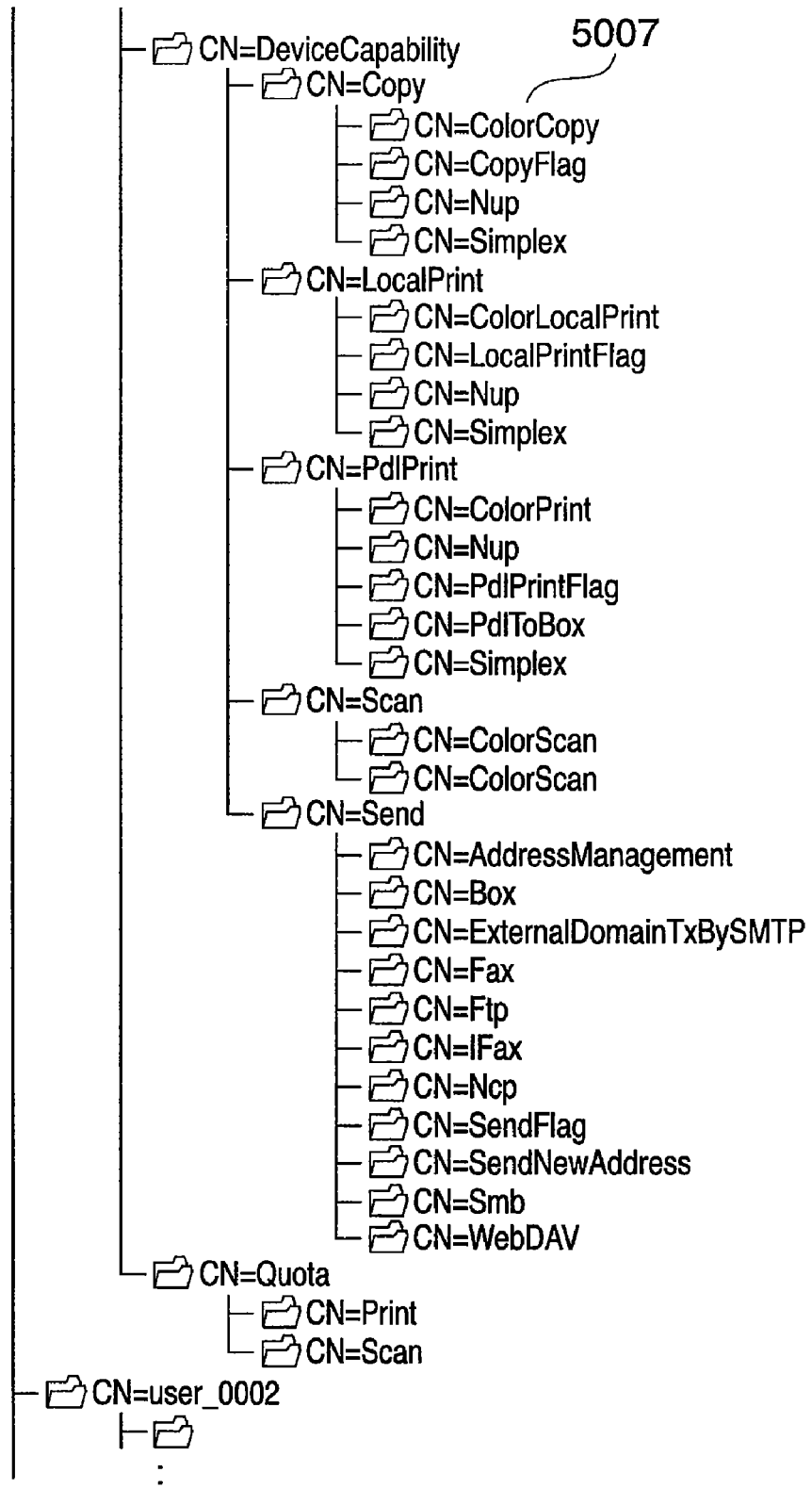
FIG. 5B is a view (continued from FIG. 5A) showing the directory structure of the functional restriction information list stored in the user information server 1001 in the first embodiment.

FIGS. 5A and 5B show the directory structure of functional restriction information lists stored in the user information server 1001 in the first embodiment. The administrator utility 1000 sets containers of the directory.

DeviceRoles 5001 is a role information container having a reference to a functional restriction information list, and contains subordinate containers such as Base 5002 and Custom 5003. The Base 5002 is a container which contains role information registered in the system in advance. The system defines five types of standard role information: an administrator, power user, general user, limited user, and guest.

The Custom 5003 is a container which contains subordinate user-defined role information extended based on the Base 5002. In the first embodiment, roles Sales1 and Sales2 are defined.

Policies 5004 is a container for a plurality of functional restriction information lists. The Policies 5004 has containers for storing the functional restriction information lists of respective roles with the same general names as those of pieces of role information of lower level than the Base 5002 and Custom 5003. In the system, the user information server 1001 stores the functional restriction information shown in FIGS. 3A and 3B as a functional restriction information list associated with roles as shown in FIGS. 5A and 5B.

In FIGS. 5A and 5B, the folder of the Sales2 role is unfolded. For the Sales2 role, restriction information including an application restriction 5006 and device capability restriction (copy, local print, and the like) 5007 is registered with a structure corresponding to FIGS. 3A and 3B.

FIG. 6 is a view showing the class structure of a user, group, role, functional restriction information list, and functional restriction information in the first embodiment. The class structure in FIG. 6 is described using UML (Universal Modeling Language). The contents shown in FIG. 6 are as follows. A plurality of roles are assignable to a user 6001, and one role is always assigned including a default role (role applied to a user to whom no role is explicitly assigned). A user can belong to a plurality of groups, and a role is also assignable indirectly through a group.

A group 6002 is a set of users, and holds 0 or more references to users. A role 6003 can have references to 0 or more users or groups. A role has one functional restriction information list 6004, and the functional restriction information list has one or pieces of functional restriction information 6005.

<Process in Ticket Issuance Server>

Figure 7:
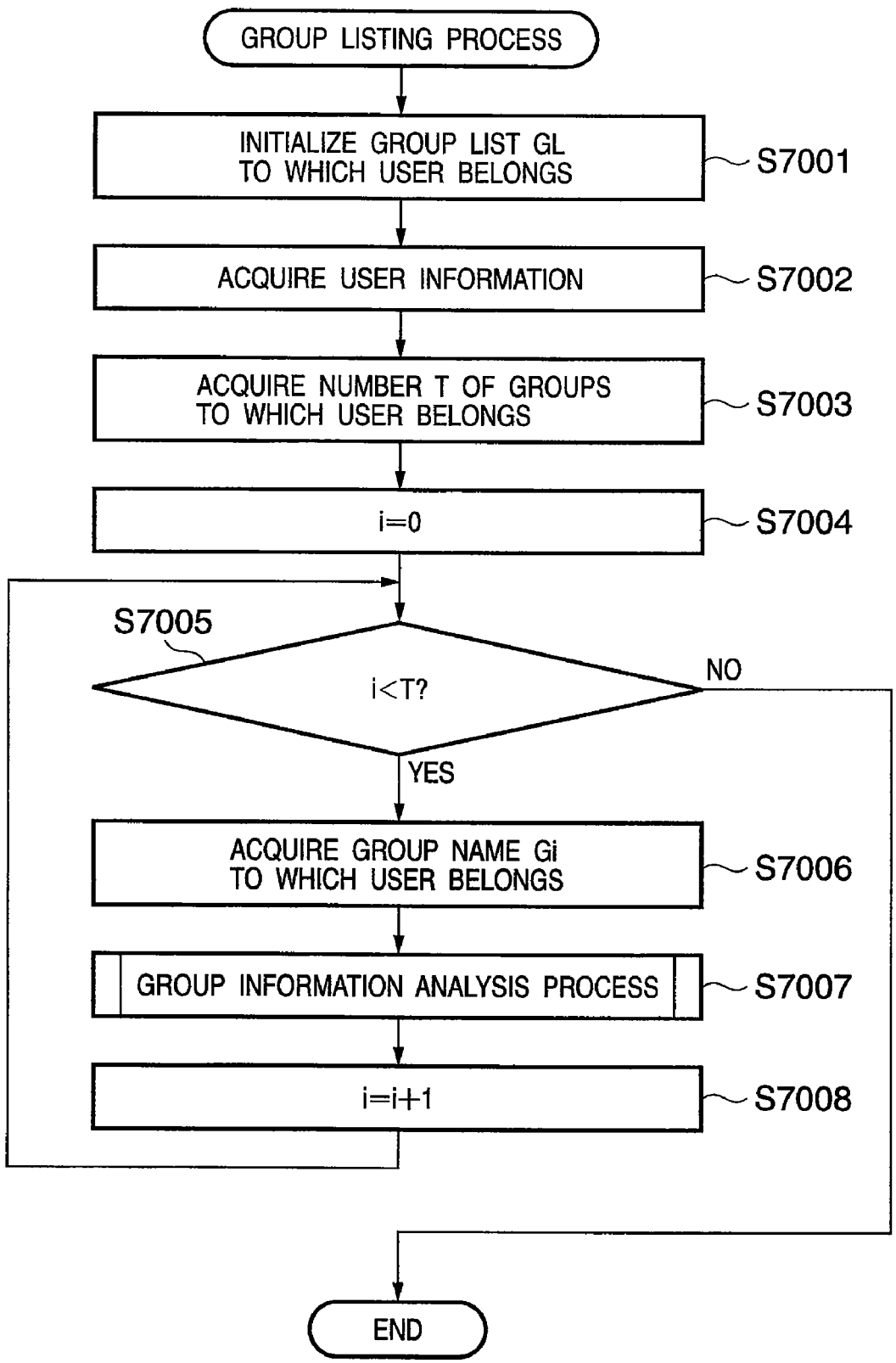
FIG. 7 is a flowchart showing a process to list groups to which the user belongs, as a pre-process when issuing an access control token 1005 in the first embodiment.

FIG. 7 is a flowchart showing a process to list groups to which the user belongs, as a pre-process when issuing the access control token 1005 in the first embodiment. The ticket issuance server 1002 executes this process. The process shown in FIG. 7 is executed responsive to a generation request of the access control token 1005 (i.e., access restriction information) issued by the client terminal. The generation request includes a user ID.

In step S7001, the ticket issuance server 1002 initializes a temporal processing group list GL, to which the user belongs, to an element count "0". In step S7002, the ticket issuance server 1002 acquires target user information by accessing the user information server 1001. In step S7003, the ticket issuance server 1002 acquires the number T of groups to which the user belongs. The target user can be specified by, e.g., a user ID received together with a ticket issuance request from a client terminal. The ticket issuance server 1002 initializes the work counter i to 0 in step S7004, and determines in step S7005 whether the counter i is smaller than the number T of groups. If the counter i is equal to or larger than the number T of groups, the process ends. If the counter i is smaller than the number T of groups, the process advances to step S7006 to acquire a group name Gi to which the target user belongs. In step S7007, the ticket issuance server 1002 performs a group information analysis process (to be described with reference to FIG. 8). In step S7008, the ticket issuance server 1002 increments the counter i to return the process to step S7005, repeating the above procedures.

Figure 8:
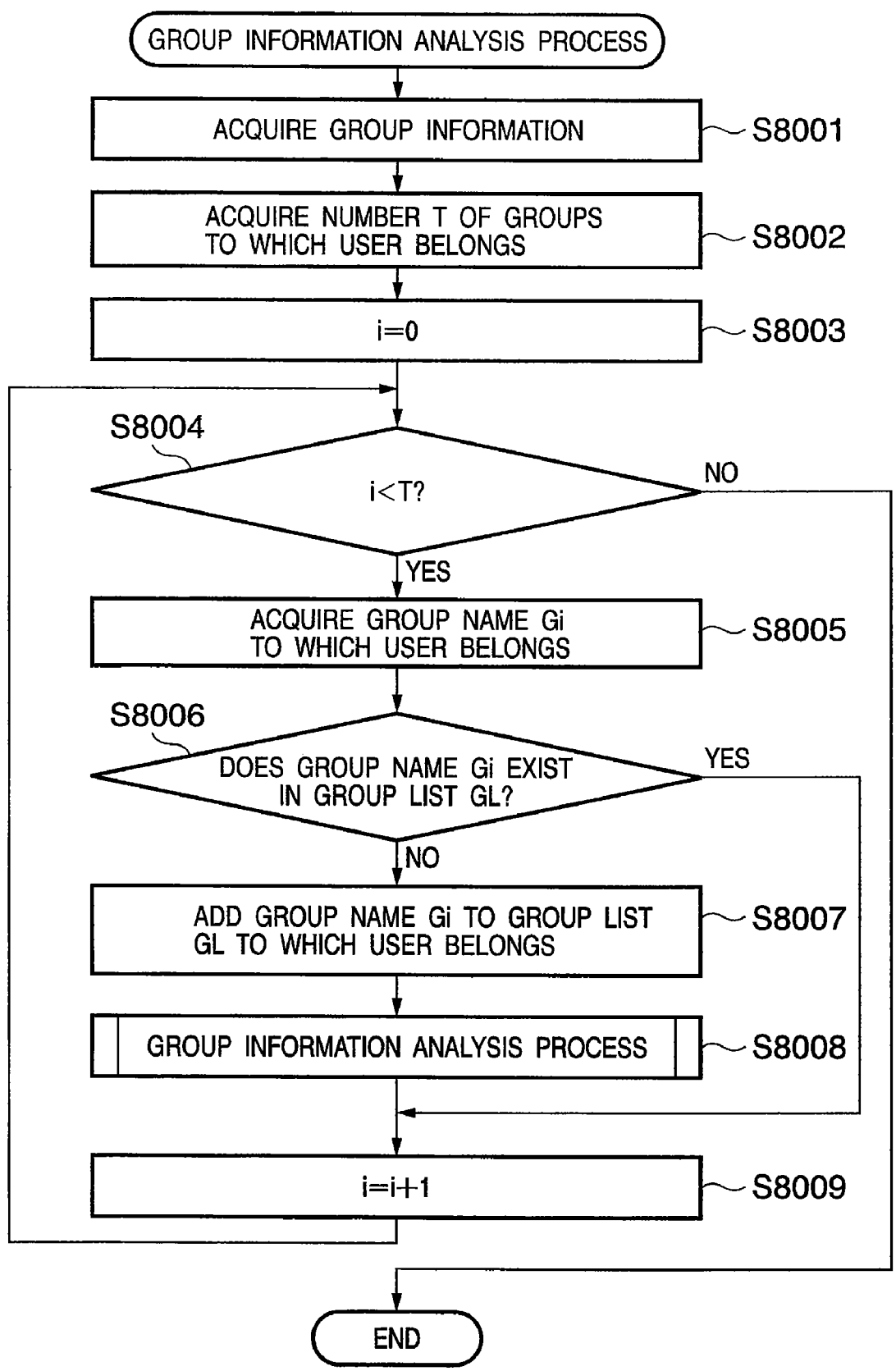
FIG. 8 is a flowchart showing a group information analysis process in the first embodiment.

FIG. 8 is a flowchart showing the group information analysis process executed in step S7007 of FIG. 7. The ticket issuance server 1002 executes this process.

In step S8001, the ticket issuance server 1002 acquires target group information by accessing the user information server 1001. In step S8002, the ticket issuance server 1002 acquires the number T of groups to which the target group belongs. The ticket issuance server 1002 initializes the work counter i to 0 in step S8003, and determines in step S8004 whether the counter i is smaller than the number T of groups. If the counter i is equal to or larger than the number T of groups, the process ends. If the counter i is smaller than the number T of groups, the process advances to step S8005 to acquire, from the group information, the group name Gi of a group to which the target group belongs. In step S8006, the ticket issuance server 1002 determines whether the group Gi to which the target group belongs exists in the group list GL in FIG. 7. If the group Gi exists, the process advances to step S8009. If no group Gi exists, the ticket issuance server 1002 additionally saves the group Gi in the group list GL of FIG. 7 in step S8007. In step S8008, the ticket issuance server 1002 performs the group information analysis process (by recursively calling the procedures in FIG. 8). In step S8009, the ticket issuance server 1002 increments the counter i to return the process to step S8004, repeating the above procedures.

By the processes in FIGS. 7 and 8, the names of all groups to which a user, who has issued a ticket issuance request to print from a client terminal, belongs directly or indirectly are registered in the group list.

Figure 9:
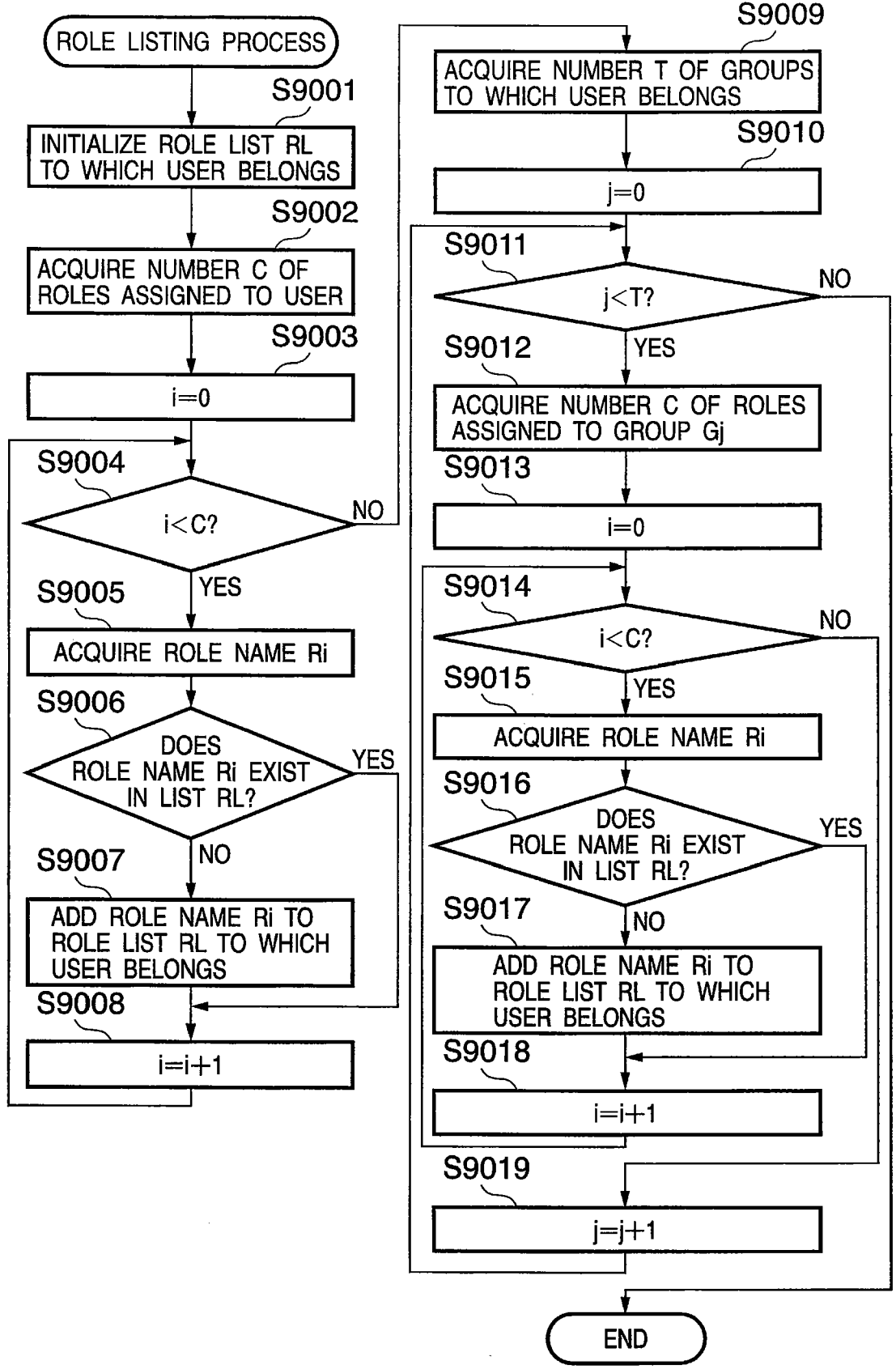
FIG. 9 is a flowchart showing a process to list roles by deleting repetitive roles from roles assigned to a user and group in the first embodiment.

FIG. 9 is a flowchart showing a process to list roles by deleting repetitive roles from roles assigned to a user and group in the first embodiment. The ticket issuance server 1002 executes this process after the process in FIG. 8.

In step S9001, the ticket issuance server 1002 initializes a temporal processing role list RL, to which the user belongs, to an element count "0". In step S9002, the ticket issuance server 1002 acquires the number C of roles assigned to the user from acquired user information. The ticket issuance server 1002 initializes the work counter i to 0 in step S9003, and determines in step S9004 whether the counter i is smaller than the number C of roles. If the counter i is smaller than the number C of roles, the process advances to step S9005 to acquire a role Ri assigned to the user from the acquired user information. In this example, seven roles are prepared, as described above, and assigned to R1 to R7. In step S9006, the ticket issuance server 1002 determines whether the role Ri assigned to the user exists in the role list RL. If the role Ri exists, the process advances to step S9008. If no role Ri exists, the ticket issuance server 1002 assigns the role Ri and adds it to the role list RL in step S9007. In step S9008, the ticket issuance server 1002 increments the counter i to return the process to step S9004, repeating the above procedures.

If the counter i is equal to or larger than the number C of roles in step S9004, the process advances to step S9009 to acquire the number T of groups from the group list GL generated by the flowcharts in FIGS. 7 and 8. The ticket issuance server 1002 initializes a work counter j to 0 in step S9010, and determines in step S9011 whether the counter j is smaller than the number T of groups. If the counter j is equal to or larger than the number T of groups, the process ends. If the counter j is smaller than the number T of groups, the process advances to step S9012 to acquire the number C of roles assigned to a group Gj from acquired group information. The ticket issuance server 1002 initializes the work counter i to 0 in step S9013, and determines in step S9014 whether the counter i is smaller than the number C of roles. If the counter i is equal to or larger than the number C of roles, the ticket issuance server 1002 increments the counter j in step S9019 to return the process to step S9011, repeating the above procedures. If the counter i is smaller than the number C of roles, the process advances to step S9015. Processes in steps S9015 to S9018 are identical to those in steps S9005 to S9008 described above, and a detailed description thereof will be omitted.

By the procedures in FIG. 9, all roles assigned directly to a target user or assigned to a group to which the target user belongs directly or indirectly are listed without overlap.

Figure 10:
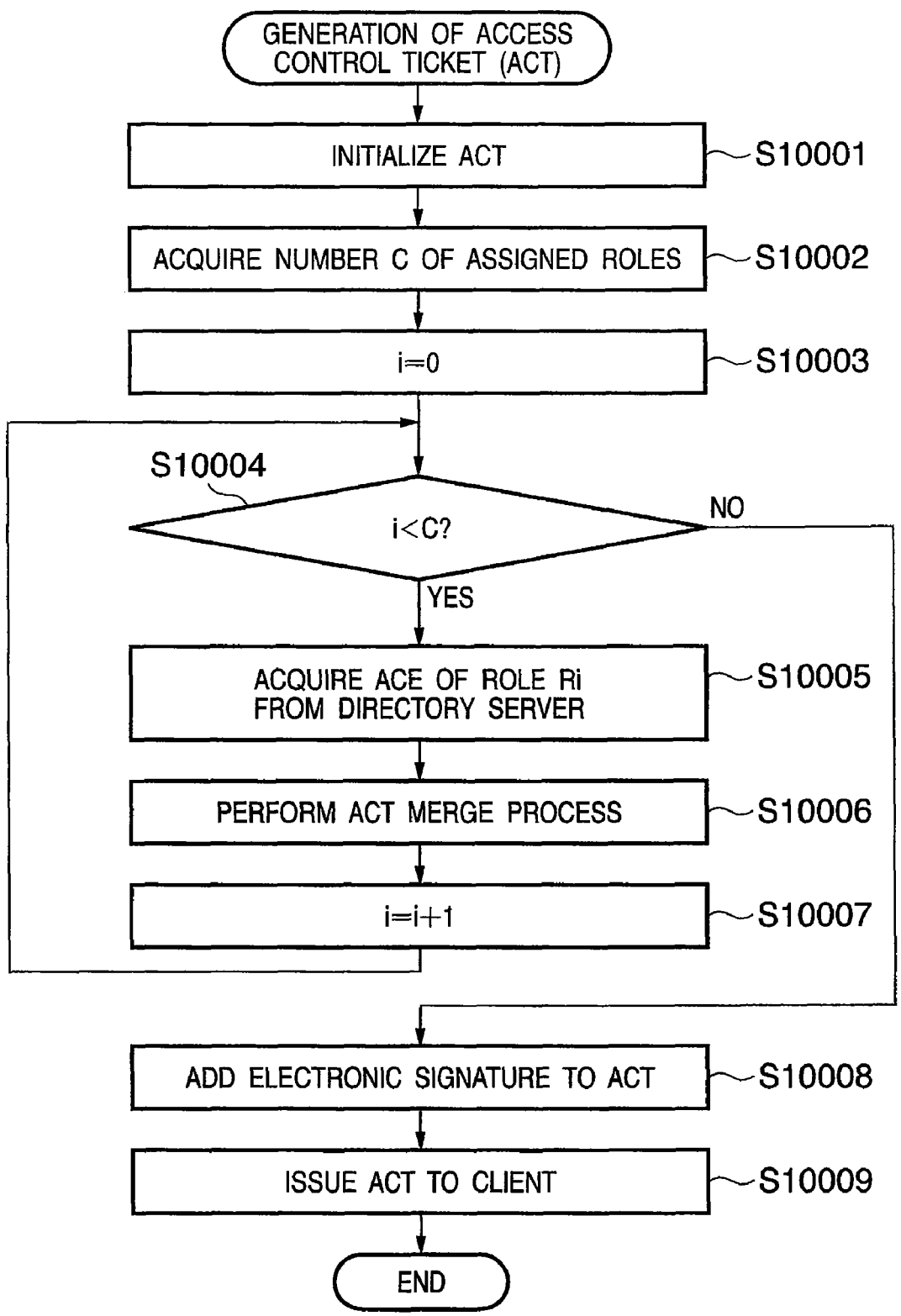
FIG. 10 is a flowchart showing a process to acquire a functional restriction information list from the user information server 1001 and generate the access control token 1005 based on a role list generated by the flowchart in FIG. 9 in the first embodiment.

FIG. 10 is a flowchart showing a process to acquire a functional restriction information list from the user information server 1001 and generate the access control token 1005 based on a role list generated by the flowchart in FIG. 9 in the first embodiment. The ticket issuance server 1002 executes the process in FIG. 10 subsequently to the process in FIG. 9.

In step S10001, the ticket issuance server 1002 acquires a functional restriction information list of default roles from the user information server 1001, and initializes the access control token 1005. In step S10002, the ticket issuance server 1002 acquires the number C of assigned roles from the role list RL calculated by the flowchart in FIG. 9. The ticket issuance server 1002 initializes the work counter i to 0 in step S10003, and determines in step S10004 whether the counter i is smaller than the number C of roles. If the counter i is equal to or larger than the number C of roles, the process advances to step S10008 to add an electronic signature to the access control token 1005. In step S10009, the ticket issuance server 1002 issues the access control token 1005 to the client, ending the process. If the counter i is smaller than the number C of roles, the process advances to step S10005 to sequentially acquire pieces of functional restriction information stored below the functional restriction information list container associated with the role Ri from the user information server 1001. In step S10006, the ticket issuance server 1002 performs a merge process (synthesis process). In step S10007, the ticket issuance server 1002 increments the counter i to return the process to step S10004, repeating the above procedures.

If functional restriction information has a preferential setting value in FIG. 11 (to be described below) in acquiring the functional restriction information, the setting value does not change even after acquiring the functional restriction information again. In this case, the process can be omitted to increase the process speed.

FIG. 11 shows an example of a merge condition table used in the merge process for the applied access control token 1005 in step S10006 of FIG. 10. The ticket issuance server 1002 holds the merge condition table. The first embodiment adopts a policy to select setting values with moderate restrictions so as to use many functions when settings are contradictory. Part of FIG. 11 will be explained. When both "permit" and "deny" are simultaneously set, "permit" is selected. When "color" and "monochrome" are simultaneously set, "color" is selected. The table contents may be to arrange the setting values of items in the priority order. The functional restriction information merge rule can be easily changed by changing the merge condition table in FIG. 11.

When strong and weak restrictions compete with each other, priority is generally given to the strong restriction in order to maintain security. The rule in FIG. 11 conflicts with this, but does not impair user friendliness.

<Access Control Token>

FIGS. 12A and 12B show an example of the access control token 1005 which is generated by the procedures in FIG. 10 and transmitted to a client in the first embodiment.

A tag 12001 describes information on a user who has acquired the access control token. In this example, the user name is user_0001, a role GeneralUser is assigned as a base role, and the mail address is user_0001@mail.com. The access control token 1005 may not contain the tag 12001 when the MFP 1004 requests issuance of the access control token 1005 upon power-on or the like.

A tag 12002 describes functions available in the MFP 1004 by the user who has acquired the access control token 1005. In this example, the tag 12002 describes that Print and Box are available ("Permit") application categories, and Copy, Send, Browser, and Utility are not available ("Deny").

The tag 12002 describes functional restriction information to the MFP 1004 when the MFP 1004 requests issuance of the access control token 1005 upon power-on or the like.

Upon reception of a print job containing the access control token 1005, the MFP executes the print job under restrictions represented by functional restriction information contained in the access control token 1005. For example, the MFP compares each item of the functional restriction information contained in the access control token 1005 with the setting of the print job. The MFP determines whether the print job uses a restricted function. If the print job uses a restricted function, the MFP transmits, to the client, a message that the print job is not executable. If the print job does not use any restricted function, the MFP executes the job.

In this manner, in the printing system with functional restriction according to the first embodiment, the ticket issuance server which receives a request merges functional restrictions defined directly or indirectly for an MFP user so as to apply the most moderate one of restrictions defined for each item. The load on the MFP can, therefore, be reduced to achieve a quick process. The merge rule can also be flexibly, easily changed. The ticket issuance server can also be regarded as a restriction information generation apparatus which generates restriction information.

Figure 14:
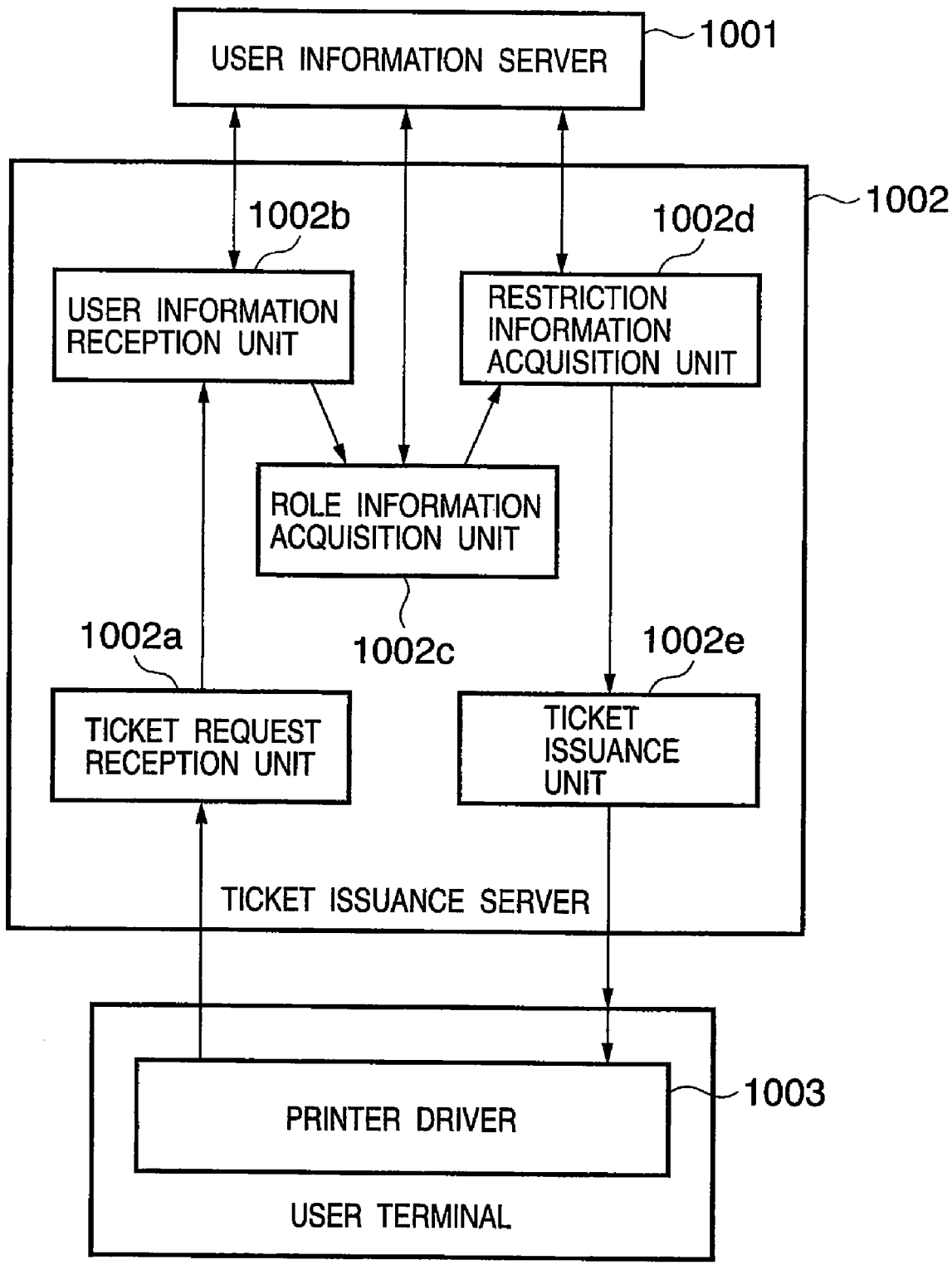
FIG. 14 is a functional block diagram of the first embodiment.

FIG. 14 shows the function blocks of the system. Before issuing a print job to the MFP 1004, the printer driver 1003 requests the ticket issuance server 1002 to issue an access control token 1005 associated with a user who is to issue a job. A ticket request reception unit 1002a receives this request.

The ticket request reception unit 1002a transfers a received user ID to a user information reception unit 1002b. The user information reception unit 1002b acquires group information to which a user corresponding to the user ID belongs. The user information reception unit 1002b transfers the user information and group information to a role information acquisition unit 1002c. The role information acquisition unit 1002c acquires role information on the roles of a user and group. The role information acquisition unit 1002c transfers the role information to a restriction information acquisition unit 1002d, which acquires functional restriction information of each role. The restriction information acquisition unit 1002d can also be called an acquisition means for acquiring functional restriction information from the restriction information management server. The restriction information acquisition unit 1002d transfers the functional restriction information to a ticket issuance unit 1002e, which generates the access control token 1005. The ticket issuance unit 1002e transmits the access control token 1005 to the user terminal. The ticket issuance unit 1002e is a merge means for generating access restriction information, and also a transmission means for transmitting it to the client terminal. The transmission is achieved via the network interface 2002 in FIG. 2.

Second Embodiment

The second embodiment will now be described. Basic drawings in the second embodiment are identical to FIGS. 1 to 12B in the first embodiment, and a detailed description thereof will be omitted.

FIG. 13 shows the merge condition of the merge process for application to an access control token 1005 in the second embodiment.

The first embodiment adopts a policy to select setting values with moderate restrictions so as to use many functions when settings are contradictory. To the contrary, the second embodiment employs a policy to select setting values with severe restrictions so as not to use many functions. Part of FIG. 13 will be explained. When both "permit" and "deny" are simultaneously set, "deny" is selected. When "color" and "monochrome" are simultaneously set, "monochrome" is selected.

In addition, the present invention may apply when a user does login from user interface of MFP so that a ticket issuance server issues an access control token for the user same as a case of print job.

The present invention may be applied to a system including a plurality of devices (e.g., a host computer, interface device, reader, and printer) or an apparatus (e.g., a copying machine or facsimile apparatus) formed by a single device. The object of the present invention is also achieved by supplying a storage medium which stores program codes for implementing the functions of the above-described embodiments to a system or apparatus, and reading out and executing the program codes stored in the storage medium by the computer of the system or apparatus. In this case, the program codes read out from the storage medium implement the functions of the above-described embodiments, and the program codes and the storage medium which stores the program codes embody the present invention.

Embodiments also include a case where an OS (Operating System) or the like running on the computer performs some or all of actual processes based on the instructions of the program codes and thereby implements the functions of the above-described embodiments. Furthermore, the present invention may also be applied to a case where the program codes read out from the storage medium are written in the memory of a function expansion card inserted into the computer or the memory of a function expansion unit connected to the computer. In this case, the CPU of the function expansion card or function expansion unit performs some or all of actual processes based on the instructions of the written program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-083870, filed Mar. 24, 2006, hereby incorporated by reference herein in its entirety.

What is claimed is:

1. A restriction information generation apparatus configured to generate access restriction information to be transmitted from a client terminal to a printing apparatus to determine whether to permit/inhibit execution of a function based on the access restriction information containing functional restriction information of the printing apparatus, the restriction information generation apparatus comprising at least a processor and memory, functioning as:

an acquisition unit, adapted to acquire, from a restriction information management server, first functional restriction information directly assigned to a user specified by user information received from a requesting client terminal, and second functional restriction information indirectly assigned to the user;

a merge unit, adapted to merge the first and second functional restriction information acquired by said acquisition unit to generate access restriction information; and a transmission unit, adapted to transmit the access restriction information generated by said merge unit to the client terminal, wherein the functional restriction information of the printing apparatus is used for determining whether or not an application providing at least a browser function and send function is available and whether or not execution of a print job is executable in accordance with print settings containing a color setting and a page layout setting, wherein the functional restriction information is directly assigned to a user by selectively associating any of a plurality of roles to the user, which contains a standard role as default of the system and an extended role defined by a user, wherein the functional restriction information is indirectly assigned to a user by selectively associating any of the plurality of roles to his/her group, and wherein said merge unit merges the directly assigned functional restriction information and the indirectly assigned functional restriction information by associating roles to generate access restriction information.

2. An apparatus according to claim 1, wherein said merge unit is configured to generate access restriction information in which a value of the most moderate restriction among the pieces of functional restriction information acquired by said acquisition unit is set for each item of the pieces of functional restriction information.

3. An apparatus according to claim 1, wherein said merge unit is configured to generate access restriction information in which a value of the severest restriction among the pieces of functional restriction information acquired by said acquisition unit is set for each item of the pieces of functional restriction information.

4. An apparatus according to claim 1, wherein the functional restriction information indirectly assigned to the user contains functional restriction information assigned to a group to which the user belongs.

5. An apparatus according to claim 1, wherein if no functional restriction information is explicitly assigned to the user, the restriction information generation apparatus is configured to use default functional restriction information as the functional restriction information directly assigned to the user.

6. A restriction information generation method for a restriction information generation apparatus which generates access restriction information to be transmitted from a client terminal to a printing apparatus that determines whether to permit/inhibit execution of a function based on the access restriction information containing functional restriction information of the printing apparatus, said restriction information generation method comprising:

an acquiring step of acquiring, from a restriction information management server, first functional restriction information directly assigned to a user specified by user information received from a requesting client terminal, and second functional restriction information indirectly assigned to the user;

a merging step of merging the first and second functional restriction information acquired in the acquiring step to generate access restriction information; and a transmitting step of transmitting the access restriction information generated in the merging step to the client terminal, wherein the functional restriction information of the printing apparatus is used for determining whether or not an application providing at least a browser function and Send function is available and whether or not execution of a print job is executable in accordance with print settings containing a color setting and a page layout setting, wherein the functional restriction information is directly assigned to a user by selectively associating any of a plurality of roles to the user, which contains a standard role as default of the system and an extended role defined by a user, wherein the functional restriction information is indirectly assigned to a user by selectively associating any of the plurality of roles to his/her group, and wherein in said merging step, the directly assigned functional restriction information and the indirectly assigned functional restriction information are merged by associating roles to generate access restriction information.

7. A non-transitory computer readable medium in which a program is embodied, the program executing the program to perform a restriction information generation method for a restriction information generation apparatus which generates access restriction information to be transmitted from a client terminal to a printing apparatus that determines whether to permit/inhibit execution of a function based on the access restriction information containing functional restriction information of the printing apparatus, said restriction information generation method comprising:

an acquisition step of acquiring, from a restriction information management server, first functional restriction information directly assigned to a user specified by user information received from a requesting client terminal, and second functional restriction information indirectly assigned to the user;

a merge step of merging the first and second functional restriction information acquired in the acquisition step to generate access restriction information; and a transmission step of transmitting the access restriction information generated in the merge step to the client terminal, wherein the functional restriction information of the printing apparatus is used for determining whether or not an application providing at least a browser function and Send function is available and whether or not execution of a print job is executable in accordance with print settings containing a color setting and a page layout setting, wherein the functional restriction information is directly assigned to a user by selectively associating any of a plurality of roles to the user, which contains a standard role as default of the system and an extended role defined by a user, wherein the functional restriction information is indirectly assigned to a user by selectively associating any of the plurality of roles to his/her group, and wherein in said merging step, the directly assigned functional restriction information and the indirectly assigned functional restriction information are merged by associating roles to generate access restriction information.

* * * * *